US007693331B2

(12) United States Patent
Porikli et al.

(10) Patent No.: US 7,693,331 B2
(45) Date of Patent: Apr. 6, 2010

(54) OBJECT SEGMENTATION USING VISIBLE AND INFRARED IMAGES

(75) Inventors: Fatih M. Porikli, Watertown, MA (US); Joseph Katz, Stony Brook, NY (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 889 days.

(21) Appl. No.: 11/512,790

(22) Filed: Aug. 30, 2006

(65) Prior Publication Data

US 2008/0056568 A1 Mar. 6, 2008

(51) Int. Cl.
*G06K 9/34* (2006.01)
(52) U.S. Cl. ...................................... 382/174
(58) Field of Classification Search ................. 382/173
See application file for complete search history.

(56) References Cited

U.S. PATENT DOCUMENTS

| | | | | |
|---|---|---|---|---|
| 5,550,936 A | * | 8/1996 | Someya et al. | 382/263 |
| 5,940,139 A | * | 8/1999 | Smoot | 348/584 |
| 6,137,910 A | * | 10/2000 | Shinagawa et al. | 382/195 |
| 6,225,620 B1 | * | 5/2001 | Campbell et al. | 250/221 |
| 6,370,260 B1 | * | 4/2002 | Pavlidis et al. | 382/103 |
| 2002/0186221 A1 | * | 12/2002 | Bell | 345/474 |

OTHER PUBLICATIONS

Y. Fang, K. Yuamada, Y. Ninomiya, B. Horn, I. Masaki, "A shape-Independent Method for Pedestrian Detection With Far-Infrared Images," IEEE Transactions on Vehicular Technology, vol. 53, No. 6, 2004, (Nov. 2004).
C. Conaire, E. Cooke, N. O'Connor, N. Murphy, A. Smeaton, "Background Modeling in Infrared and Visible Spectrum Video for People Tracking," Proc. of IEEE Int'l workshop on Object Tracking & Classification Beyond the Visible Spectrum, 2005, (Jun. 2005).

* cited by examiner

*Primary Examiner*—Vikkram Bali
*Assistant Examiner*—Eueng-Nan Yeh
(74) *Attorney, Agent, or Firm*—Dirk Brinkman; Gene Vinokur

(57) ABSTRACT

A method tracks an object. A sequence of visible images and a sequence of infrared images are acquired concurrently of a scene. A visible background image is maintained from each current visible image, while an infrared background image is maintained from each current infrared image. Each current visible image and the visible background image, and each current infrared image and the infrared background image are compared to generate corresponding changed pixels. Shadow pixels and reflectance pixels are discarded from the changed pixels to identify foreground pixels associated with an object in the scene.

18 Claims, 5 Drawing Sheets

OBJECT SEGMENTATION USING VISIBLE AND INFRARED IMAGES

FIELD OF THE INVENTION

This invention relates generally to segmenting objects in a sequence of images, and more particularly to detecting and tracking moving objects segmented from a sequence of images.

BACKGROUND OF THE INVENTION

Infrared (IR) radiation refers to that part of the electromagnetic spectrum where the wavelength is longer than visible light, but shorter than radio waves, i.e., between approximately 750 nm and 1 mm. Cameras can be used to acquire IR images. Because IR images can capture thermal characteristics of objects, IR images are useful for scenes with extremely low light conditions, such as natural outdoor scenes at night. Infrared imaging can be used in surveillance systems to detect 'warm' objects, such as people, animals and vehicles. It should be noted that infrared images can also be acquired of day time scenes.

IR imaging, unlike visible imaging, does not depend on lighting conditions, but rather on varying temperatures. Therefore, IR imaging can operate under very low light conditions, such as the nighttime. Even in the daytime, the independence on lighting conditions can be an advantageous because lighting conditions generally change faster than temperature, especially in scenes where clouds temporarily occluding sunlight, or as objects move in and out of shadows.

Therefore, background adaptation is generally less crucial in IR images than in visible images. Foreground detection using background subtraction is also easier with IR images because there are no shadows, while shadow removal is an important issue for background subtraction with visible images.

However, due to camera technology limitations, uncooled IR cameras tend to have a lower spatial resolution and are less sensitivity than color cameras. This can limit an efficacy of a classification step based on object silhouette or shape, especially when the object is far from the cameras.

BACKGROUND-FOREGROUND SEGMENTATION

Most segmentation systems that operate on IR images assume that objects are "warmer" than the background, or in more technical terms, result of multiplication of emissivity and object temperature is greater than result of multiplication of emissivity and background temperature. This is true most of the time, especially at night and during the winter. Typically, the contrast between the background and a foreground object, such as a person, is significant. Systems making this assumption have a less complicated segmentation step.

One segmentation step applies a threshold to select "hot" interesting regions. This technique is more applicable to bolometer-based IR cameras that are able to determine the absolute temperature of objects. Other techniques select regions that are hotter than the background and have a significant contrast with the background.

One technique constructs a histogram to detect vertical bands having significant contrast with the background and likely to contain an object. Then, in each 'interesting' band, the highest and lowest bright pixels location are estimated in order to completely define region-of-interest (ROI) boundaries, Y. Fang, K. Yuamada, Y. Ninomiya, B. Horn, I. Masaki, "A shape-Independent Method for Pedestrian Detection With Far-Infrared Images," IEEE Transactions on Vehicular Technology, Vol 53, No 6, 2004.

In another approach, a histogram is constructed of the image. The histogram has a Gaussian shape centered on the background mean value and a little "bump" corresponding to the ROI pixels. Then, the ROI is selected by extracting the pixels which are not in the large peak that have a value higher than the background mean value and which are grouped in objects with a minimum size, C. Conaire, E. Cooke, N. O'Connor, N. Murphy, A. Smeaton, "Background Modeling in Infrared and Visible Spectrum Video for People Tracking," Proc. of IEEE Int'l workshop on Object Tracking & Classification Beyond the Visible Spectrum, 2005. Those techniques, while generally fast and efficient, are unable to detect objects that are colder than the background. This situation can happen on hot days.

Another advantage of background subtraction is that it does nor consider background hot spots as foreground regions. Under most common conditions, where objects are considerably warmer than the background, ROI segmentation in IR images is efficient. However when objects are not warmer than the background, a threshold-based classification becomes inefficient, and segmentation techniques like background subtraction or motion detection, should be used.

SUMMARY OF THE INVENTION

A method tracks an object. A sequence of visible images and a sequence of infrared images are acquired concurrently of a scene. A visible background image is maintained from each current visible image, while an infrared background image is maintained from each current infrared image.

Each current visible image and the visible background image, and each current infrared image and the infrared background image are compared to generate a corresponding list of changed pixels.

Shadow pixels and reflectance pixels are discarded from the list of changed pixels to identify foreground pixels associated with an object in the scene.

DETAILED DESCRIPTION OF THE PREFERRED EMBODIMENT

System and Method Overview

Figure 1:
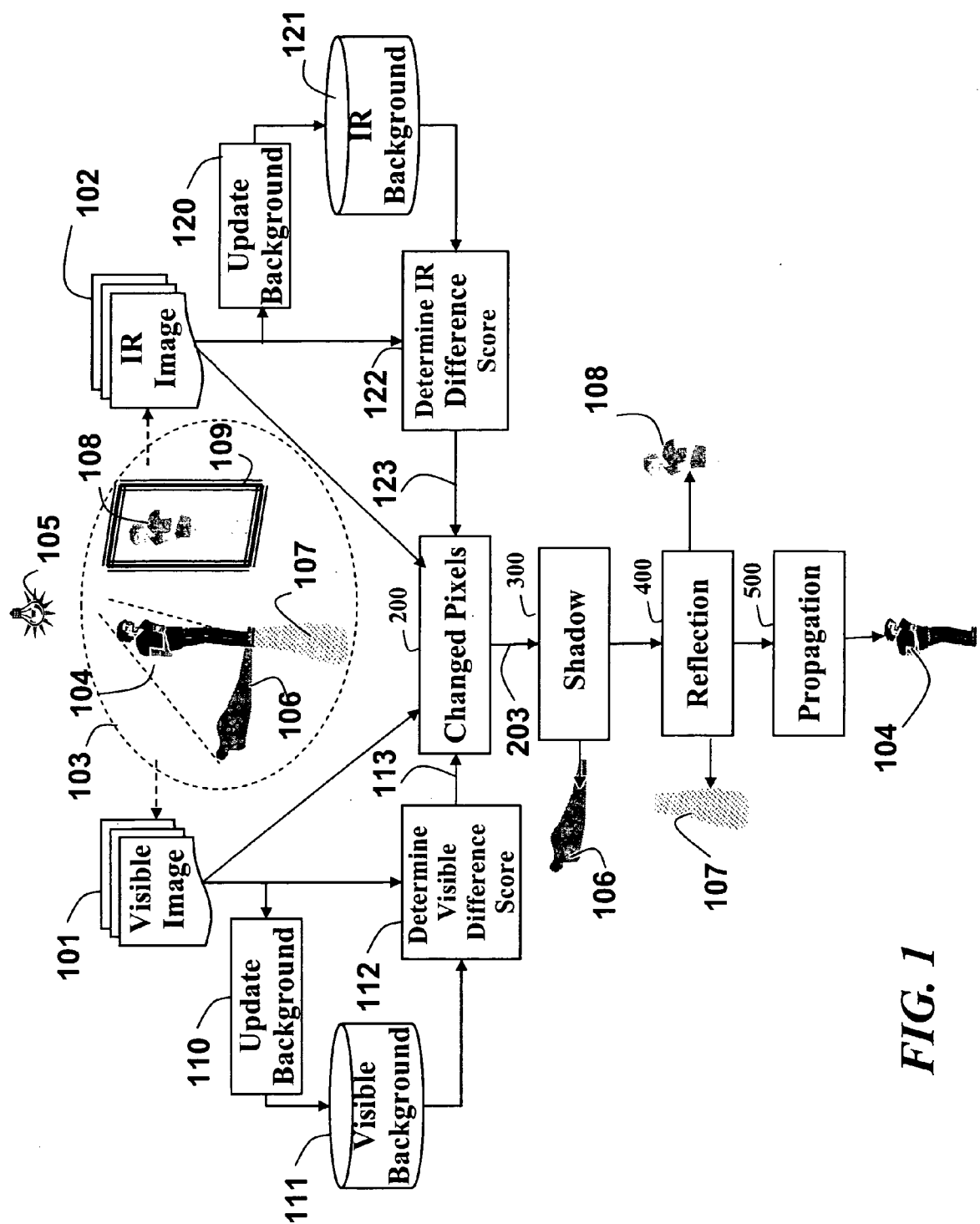
FIG. 1 is a flow diagram of a method for segmenting an object from images according to an embodiment of the invention.

As shown in FIG. 1, a sequence of visible images 101 and a corresponding sequence of infrared (IR) images 102 are acquired concurrently of a scene 103. If the scene includes a fast moving object, the sequences can be synchronized in time. Synchronization is less important if the scene is relatively static. The scene 103 includes an object 104, e.g. a moving person. All the images that are acquired and processed can be stored in a memory.

If the scene is illuminated by directed lighting 105, the object can cast a shadow 106. The scene can also include an IR reflection 107, and IR and visible reflections 108 of the object in some reflecting surface 109. Note, because of the longer wavelength, the IR reflection can be from surfaces that may not reflect visible light. The shadow and the reflections can have a shape that corresponds to the object. Therefore for many computer vision applications, it desired to detect just the object, and to discard shadows and reflections of the object.

The images in the sequence of images are processed sequentially in their temporal order, such that each next image to be processed become the current image that is processed. The current visible image 101 is used to update 110 a visible background image 111. This means as each next input image is processed, that image becomes the current image to update the background image. The images can be a single image or several layered images, in which each layer corresponds to a (RGB) color.

The current visible background 111 and a current image 101 are compared to determine 112 visible difference score 113. For each pixel, the visible difference score 113 represents a difference between the pixel in the current visible image and in the visible background image. The difference can be indicated by a negative or positive sign, i.e., the difference score does not need to have a magnitude. Typically, the difference scores are obtained by subtracting the background image from the current image.

The difference scores are calculated by comparing the current visible image to a set of background images (or 'models') representing the static parts of the scene. The pixel-wise background images are adapted directly by the previous values for static camera or scenes. For moving cameras or scenes, the images or models can be fit after consecutive frames are aligned on a mosaic by global motion estimation. In general, movement can be due to either camera motion, or movement of the scene, or both.

We define the background as layers of multivariate Gaussian functions $$\{(\theta_t^i, \Sigma_t^i, k_t^i, v_t^i)\}_{i=1\ldots k},$$

where $\theta_t^i$ is the posterior mean, $$\Sigma_t^i$$

is the marginal posterior covariance, $U_t^i$ is the degrees of freedom, $K_t^i$ is the number of prior measurements of the $i^{th}$ layer, and k is the number of layers in 3D color space.

At each frame, we update the layer parameters using an online Bayesian estimation method as described by Porikli, F. and Tuzel, O., "Bayesian Background Modeling for Foreground Detection, Proc. of ACM Visual Surveillance and Sensor Network," incorporated herein by reference. We order the layers according to confidence scores. Our confidence measure is inversely proportional to the determinant of a covariance:

$$C = \frac{1}{|\Sigma_{\mu|X}|} = \frac{k_t^3(v_t - 2)^4}{(v_t - 4)|\Lambda_t|}.$$

Then, we select the layers having a confidence value greater than a layer threshold. We measure the Mahalanobis distance of observed color I(x) from the layers $$d_i(x) = (I(x) - \mu_{t-1}^i)^T (\Sigma_{t-1}^i)^{-1} (I(x) - \mu_{t-1}^i),$$

and update the parameters of the confident layers. Pixels that are outside of the 99% confidence interval of all confident layers of the background are considered as foreground pixels. After the update, the visible detection score difference score 113 at a pixel is selected as the minimum distance or difference of the mean of the layers:

$$\text{distance score}(x) = I(x) - \mu_z(x)$$

where z is the most confident layer, $\mu_z(x)$ is the mean value of the most confident layer.

Similarly, the sequence of IR images 102 can be used to update 120 an IR background image to determine 122 IR difference scores 123. The processing of the infrared images is concurrent with the processing of the visible images.

Next, we identify 200 changed pixels. The changed pixels can include shadow pixels, reflectance pixels, and true foreground pixels. Therefore, from the changed pixels 203, we determine 300 shadow pixels, which are discarded. Next, we can determine 400 optional reflectance pixels, which are also discarded. Finally, we can apply 500 optional region-wise propagation to the remaining pixels to eliminate pixels with singular labels. These are probably due to noise. Any remaining pixels can be considered foreground pixels corresponding to the object 104.

Changed Pixels

Figure 2:
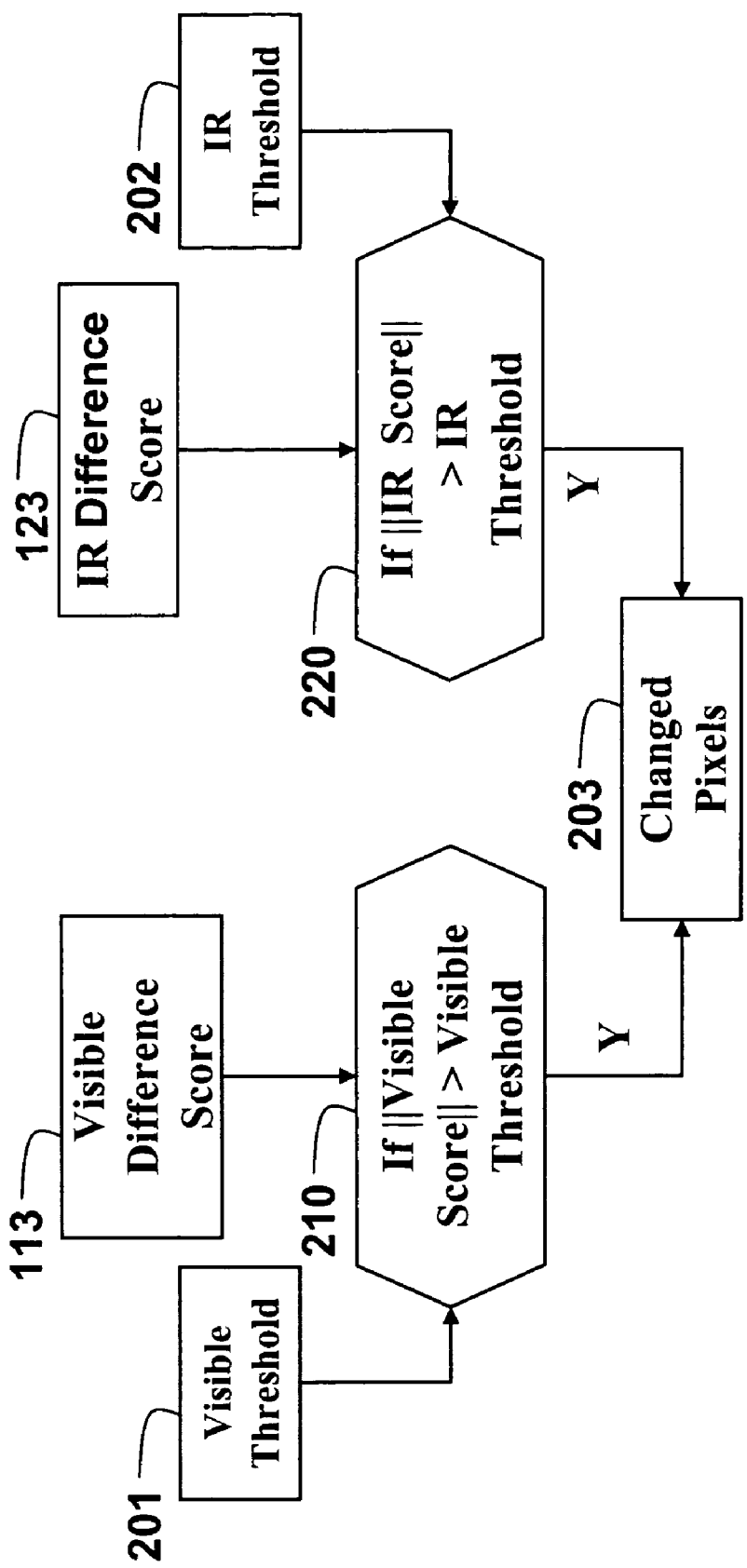
FIG. 2 is a flow diagram of a process for detecting changed pixels.

FIG. 2 shows the steps for determining 200 the changed pixels 203. It is presumed that if a pixel does not change from image to image, then the pixel must be part of the background. If the pixel does change, then the pixel could be a foreground pixel. Therefore, as input the determining 200 takes the visible and IR scores 113 and 123, compares the scores to respective thresholds 201-202 to identify changed pixels 203. The pixel is changed if either the visible thresholding 210 or the IR thresholding 220 is satisfied.

Shadow Pixels

Figure 3:
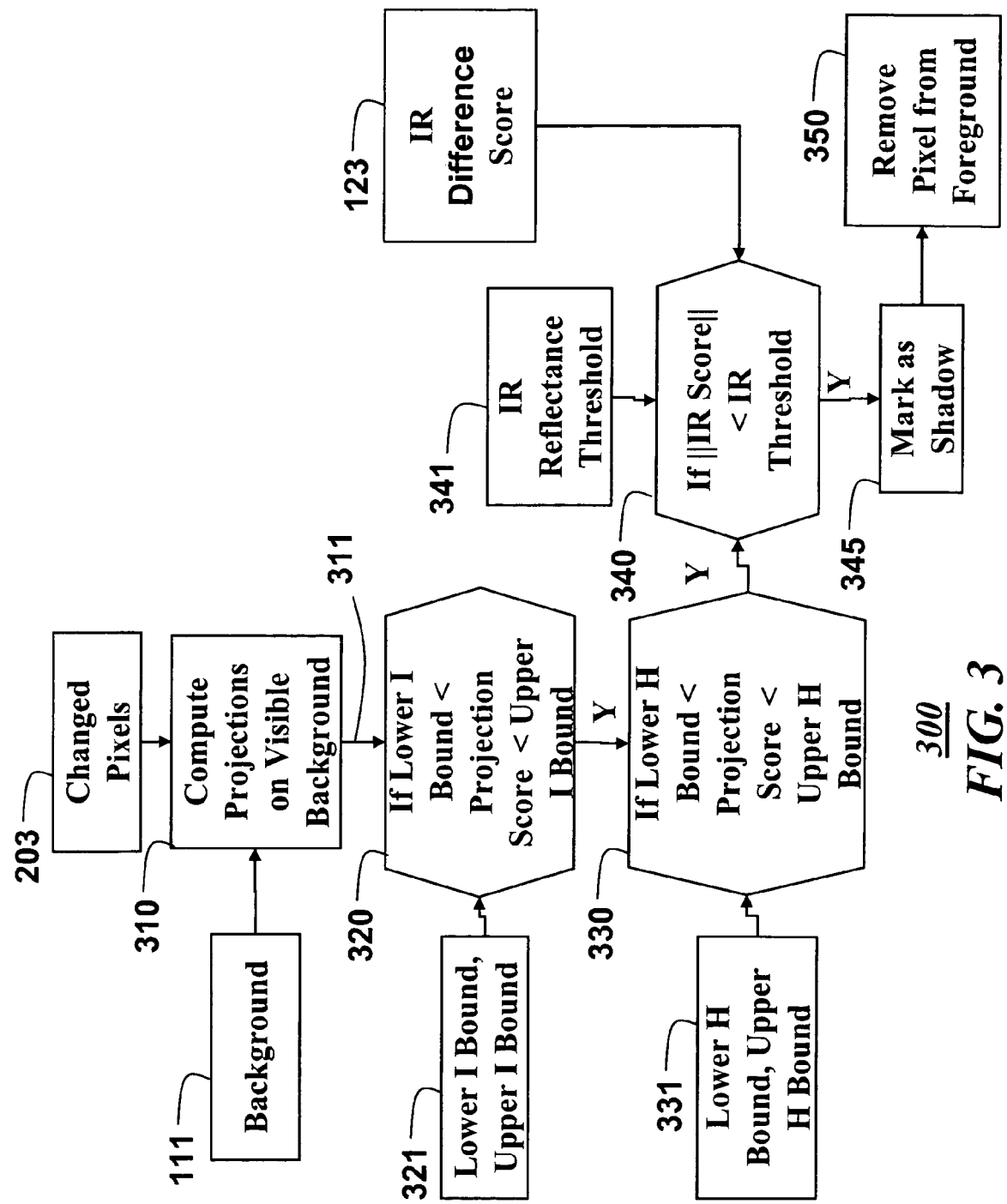
FIG. 3 is a flow diagram of a process for detecting shadow pixels.

As shown in FIG. 3, the changed pixels are processed 300 for shadow detection. First, each pixel is projected 310 on the corresponding background pixel to determine a projection score 311. If the background includes multiple color layers, then the projection is only on the layer with the most dominant color. The projection is a dot product of color vectors.

Then, an intensity constraint 321 is applied 320 to the projection score 311, followed by applying 330 a hue constraint 331. If the intensity component of the projection score is between lower and higher intensity (I) bounds 321, and the hue component is between lower and upper hue (H) bounds 331, then the pixel is possibly a shadow pixel.

Any intensity change that has a smaller intensity than the lower bound is presumed to be a foreground pixel. An intensity change that is greater than the upper bound indicates a specular highlight of the object. Thus, both cannot be shadows. Because a shadow does not change the chrominance of a pixel, the hue projection should be between the corresponding hue lower and upper bounds 331.

Next, if the constraints 321 and 331 are satisfied, then we evaluate 340 the IR difference score 123 for possible shadow pixels. The IR difference score is compared to a IR reflectance threshold 341. If the score is less than the IR threshold, then this indicates that even though there is a substantial change in the color values, there is no substantial change in the IR score. Thus, the pixel may not actually correspond to a warm object. Therefore, we mark 345 the pixel as a shadow pixel, and remove 350 the pixel from the list of changed pixels 203.

Reflectance Pixels

Figure 4:
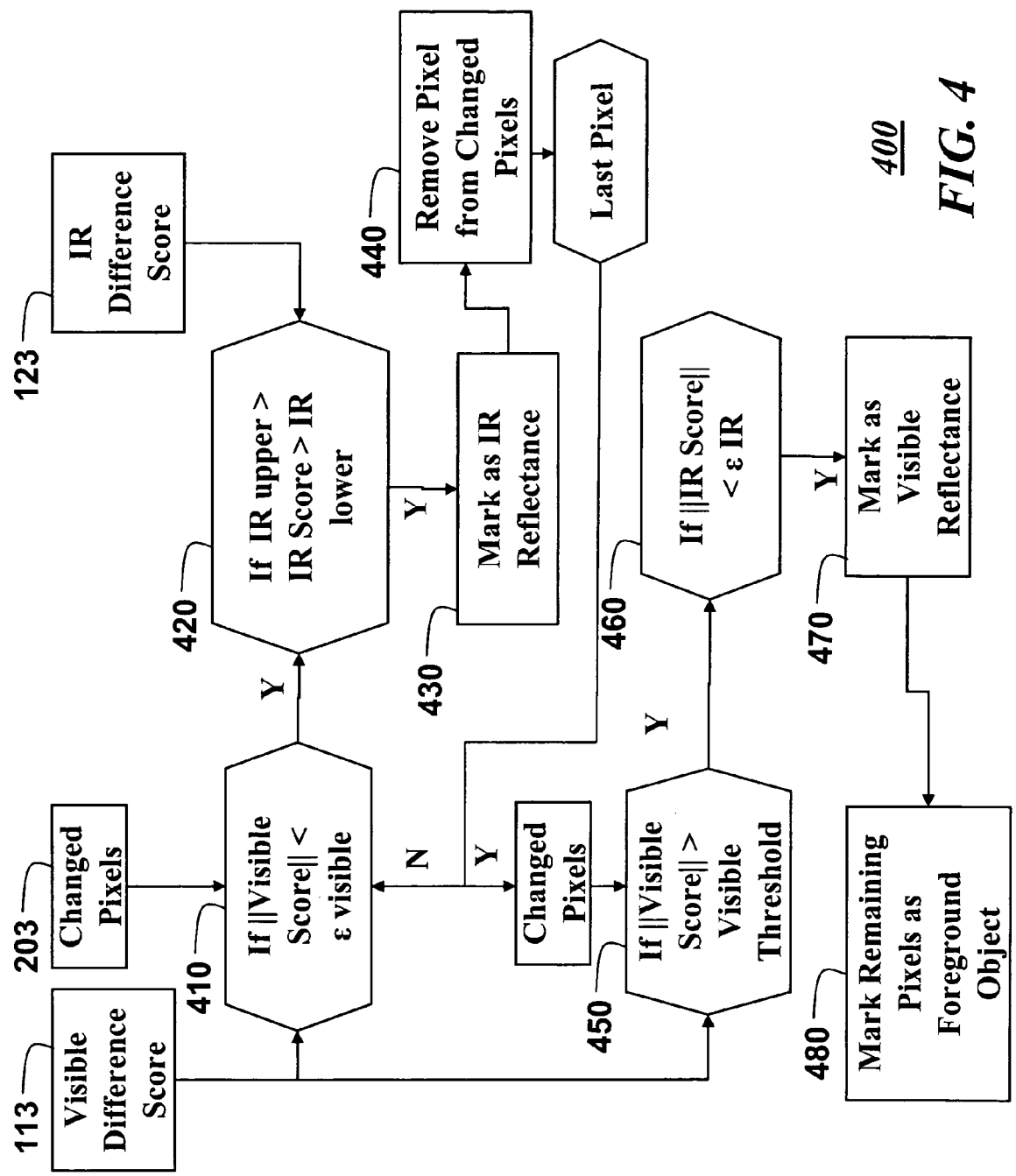
FIG. 4 is a flow diagram of a process for detecting reflectance pixels.
Figure 5:
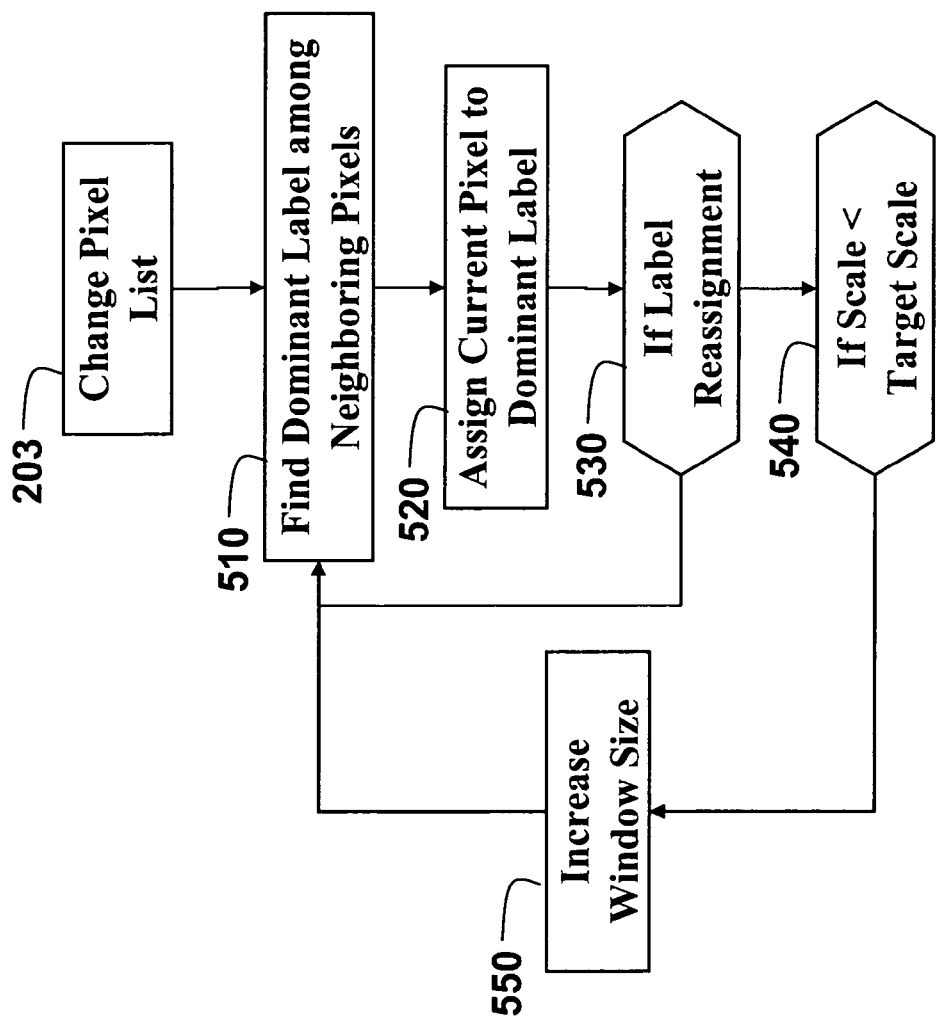
FIG. 5 is a flow diagram of a process for propagating pixel types.

FIG. 4 shows the steps for detecting and removing reflectance pixels. For each remaining changed pixel 203, after shadow pixel removal 300, we compare 410 the magnitude of the visible difference score 113 of the pixel with a small (epsilon) threshold. We verify 420 that the IR difference score (not the magnitude) is between IR upper and IR lower bounds. If the pixel satisfies both of the constraints, then we mark 430 this pixel as an IR reflectance pixel, and remove 440 the pixel from the changed pixels 203.

Next, we compare 450 the magnitude of the visible difference score 113 with the visible threshold, and then we compare 460 the magnitude of the IR difference score with a small (epsilon) IR threshold. If both constraints are satisfied, then the pixel is marked 470 as a visible reflectance pixel.

The remaining unmarked changed pixels are finally marked 480 as foreground object pixels.

Note that the above visible and IR difference scores can be determined using the visible and IR gradients instead of the intensities.

Propagation

After the pixel-wise evaluations, we iteratively go over all the changed pixels 203 one at the time to eliminate singular pixels, in an optional post-processing step. This is basically a data smoothing step.

For a moving window, with a given window size, we select all neighboring pixels of a current central pixel and determine 510 a membership map that counts the number of object (foreground) pixels, shadow pixels, IR reflectance pixels, and visible reflectance pixels in the window. We assign 520 a label to the current pixel that corresponds to the maximum of object, shadow, IR reflectance, or visible reflectance counts. That is, the label indicates the dominant pixel type in the moving window. These smoothing steps are applied repeatedly until there is no further label reassignment 530. That is, the window size is increased 550, if the current scale is less than a target scale 540, and the above evaluation process is repeated.

Effect of the Invention

Object detection techniques in visible images do not depend on the ambient temperature, and thus, remain constant in all the seasons. However, because the techniques do depend on having some minimal level of ambient light, the performance is usually unacceptable at night, unless auxiliary illumination is provided. Classification of objects in infrared images is more difficult due to a lower amount of object information, which is due to a lower spatial resolution and lack of spectral and texture information. This is also a problem for motion-based classifiers that indirectly use this information in a tracking step. By fusing visible and infrared images, the overall object detection process can be improved.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for segmenting an object in images, method comprising the steps of:
    maintaining concurrently a visible background image from each current visible image in a sequence of visible images, and an infrared background image from each current infrared image in a sequence of infrared images;
    comparing concurrently each current visible image and the visible background image, and each current infrared image and the infrared background image to generate corresponding changed pixels; and
    discarding shadow pixels from the changed pixels to identify foreground pixels associated with a moving object in the scene, wherein the discarding further comprising:
    projecting the current image on the corresponding background image to determine projection scores;
    applying intensity constraints and hue constraints to the projection scores to determine possible shadow pixels; and
    evaluating the possible shadow pixels using IR difference score to determine the shadow pixels.

2. The method of claim 1, further comprising:
    discarding reflectance pixels from the changed pixels.

3. The method of claim 2, in which the reflectance pixels include visible reflectance pixels and thermal reflectance pixels.

4. The method of claim 2, in which the generating of changed pixels depends on visible difference scores and IR difference scores, and the discarding of the reflectance pixels further comprising:
    comparing, for each changed pixel, a magnitude of the visible difference score with an epsilon threshold, and the IR difference score with an IR upper bound and an IR lower bounds to determine the reflectance pixels.

5. Method of claim 4, further comprising:
    comparing, for each changed pixel, the magnitude of the visible difference score with a visible threshold, and a magnitude of the IR difference score with an epsilon IR threshold to determine the reflectance pixels.

6. The method of claim 1, in which the scene is moving.

7. The method of claim 1, in which the sequence of visible images and the sequence of infrared images are synchronized.

8. The method of claim 1, in which the sequence of visible images include multiple color layers.

9. The method of claim 1, in which the comparing determines difference scores.

10. The method of claim 9, in which the difference scores are in terms of positive and negative signs.

11. The method of claim 9, in which the difference scores are thresholded.

12. The method of claim 1, in which the comparing is a subtraction operation.

13. The method of claim 1, further comprising:
    eliminating singular pixels from the changed pixels.

14. The method of claim 13, in which a particular pixel in a window of a predetermined size is assigned a label corresponding to a label of a maximum number of pixels in the window.

15. An apparatus for segmenting an object in images, apparatus comprising:
    computer memory for maintaining concurrently a visible background image from each current visible image in a sequence of visible images, and an infrared background image from each current infrared image in a sequence of infrared images;

means for generating changed pixels using the current and the background visible images, and the current and the background infrared images; and means for discarding shadow pixels from the changed pixels to identify foreground pixels associated with a moving object in the scene, wherein the means for discarding further comprising:

means for Projecting the current image on the corresponding background image to determine projection scores;

means for applying intensity constraints and hue constraints to the projection scores to determine possible shadow pixels; and means for evaluating the possible shadow pixels using IR difference score to determine the shadow pixels.

16. The apparatus of claim 15, further comprising:

means for discarding reflectance pixels from the changed pixels.

17. The apparatus of claim 16, further comprising:

means for eliminating singular pixels from the changed pixels.

18. The apparatus of claim 15, further comprising:

means for acquiring concurrently the sequence of visible images and the sequence of infrared images of a scene.

* * * * *